US008199395B2

(12) United States Patent
Whitesides et al.

(10) Patent No.: US 8,199,395 B2
(45) Date of Patent: Jun. 12, 2012

(54) PARTICLES FOR USE IN ELECTROPHORETIC DISPLAYS

(75) Inventors: Thomas H. Whitesides, Somerville, MA (US); Andrew Y. Oleson, Cambridge, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 13/198,855

(22) Filed: Aug. 5, 2011

(65) Prior Publication Data

US 2011/0284808 A1 Nov. 24, 2011

Related U.S. Application Data

(62) Division of application No. 11/776,633, filed on Jul. 12, 2007, now Pat. No. 8,018,640.

(60) Provisional application No. 60/807,203, filed on Jul. 13, 2006.

(51) Int. Cl.
*G02B 26/00* (2006.01)
*G09G 3/34* (2006.01)
*G03G 17/04* (2006.01)

(52) U.S. Cl. ............... 359/296; 345/107; 430/32

(58) Field of Classification Search .......... 359/296; 349/33; 345/49, 105, 107; 430/31, 32; 204/450, 204/600; 250/70, 208.1; 438/929
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |

(Continued)

FOREIGN PATENT DOCUMENTS

EP 1 099 207 B1 3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

(Continued)

*Primary Examiner* — Dawayne Pinkney
(74) *Attorney, Agent, or Firm* — David J. Cole

(57) ABSTRACT

A particle for use in an electrophoretic display comprises a light-scattering inorganic core and a light-transmissive colored shell of an organic pigment. The core may be titania and the shell may be formed of particles having an average particle size less than 700 nm. The particles are produced by treating a light-scattering inorganic pigment with a polymer which adsorbs on both the inorganic pigment and an organic pigment; and adding the organic pigment and allowing the organic pigment to mix with the polymer-coated inorganic pigment. The particles may have a polymer coating.

5 Claims, 1 Drawing Sheet

U.S. PATENT DOCUMENTS

| | | | |
|---|---|---|---|
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |

| | | |
|---|---|---|
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 2002/0044333 A1 | 4/2002 | Shigehiro et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0035941 A1 | 2/2005 | Albert et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0255320 A1* | 11/2005 | Noguchi ................ 428/403 |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0127668 A1* | 6/2006 | Jobmann et al. ......... 428/403 |
| 2006/0132895 A1 | 6/2006 | Miyazaki et al. |
| 2006/0134564 A1 | 6/2006 | Chari et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0158109 A1* | 7/2006 | Takahashi et al. ......... 313/506 |
| 2006/0176267 A1 | 8/2006 | Honeyman et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2007/0013683 A1 | 1/2007 | Zhou et al. |
| 2007/0035532 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2008/0013155 A1 | 1/2008 | Honeyman et al. |
| 2008/0024482 A1 | 1/2008 | Gates et al. |
| 2008/0074730 A1 | 3/2008 | Cao et al. |

FOREIGN PATENT DOCUMENTS

| | | |
|---|---|---|
| EP | 1 145 072 B1 | 5/2003 |
| JP | 01-114829 A | 5/1989 |
| JP | 2000-227612 | 8/2000 |
| JP | 2004-004469 | 1/2004 |
| JP | 2004-029699 | 1/2004 |
| JP | 2004-233831 | 8/2004 |
| JP | 2004-318008 | 11/2004 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

PARTICLES FOR USE IN ELECTROPHORETIC DISPLAYS

REFERENCE TO RELATED APPLICATIONS

This application is a divisional of copending application Ser. No. 11/776,633 filed Jul. 12, 2007 (Publication No. 2008/0013156), which claims benefit of copending Application Ser. No. 60/807,203, filed Jul. 13, 2006.

This application is also related to:
(a) U.S. Pat. No. 6,822,782;
(b) application Ser. No. 11/673,269, filed Feb. 9, 2007 (Publication No. 2007/0128352, now U.S. Pat. No. 7,411,720); and
(d) U.S. Pat. No. 7,230,750.

The entire contents of these patents and copending applications, and of all other U.S. patents and published and copending applications mentioned below, are herein incorporated by reference.

BACKGROUND OF INVENTION

This invention relates to particles for use in electrophoretic displays, and to electrophoretic media and displays incorporating such particles. More specifically, this invention relates to particles which enable the use, in electrophoretic media and displays, of organic pigments which, in their normal form, have particle sizes too small for use in electrophoretic media and displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Particle-based electrophoretic displays have been the subject of intense research and development for a number of years. In this type of display, a plurality of charged particles move through a fluid under the influence of an electric field. Electrophoretic displays can have attributes of good brightness and contrast, wide viewing angles, state bistability, and low power consumption when compared with liquid crystal displays. In such electrophoretic displays, an optical property is changed by application of the electric field; this optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; and 7,236,792; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284;

2005/0122306; 2005/0122563; 2005/0134554; 2005/ 0151709; 2005/0152018; 2005/0156340; 2005/0179642; 2005/0190137; 2005/0212747; 2005/0213191; 2005/ 0219184; 2005/0253777; 2005/0280626; 2006/0007527; 2006/0024437; 2006/0038772; 2006/0139308; 2006/ 0139310; 2006/0139311; 2006/0176267; 2006/0181492; 2006/0181504; 2006/0194619; 2006/0197736; 2006/ 0197737; 2006/0197738; 2006/0202949; 2006/0223282; 2006/0232531; 2006/0245038; 2006/0256425; 2006/ 0262060; 2006/0279527; 2006/0291034; 2007/0035532; 2007/0035808; 2007/0052757; 2007/0057908; 2007/ 0069247; 2007/0085818; 2007/0091417; 2007/0091418; 2007/0097489; 2007/0109219; 2007/0128352; and 2007/ 0146310; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184, 856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see US Patent Publication No. 2004/0226820); and other similar techniques.) Thus, the resulting display can be flexible. Further, because the display medium can be printed (using a variety of methods), the display itself can be made inexpensively.

The requirements for particles used in electrophoretic media are complex. The particles need to provide high optical density even when present only in very thin layers; because the switching speed of an electrophoretic medium (i.e., the time taken at a given voltage for the medium to change from one of its extreme optical states to the other) is proportional to the thickness of the medium, it is desirable to use a thin layer of the electrophoretic material itself, typically of the order of 50 μm or less, and in such thin media there may be only the equivalent of about a 2 μm thick layer of electrophoretic particles present. The electrophoretic particles need to maintain a stable charge, so that they will respond in a predictable manner to an electric field, and must not stick to surfaces with which they come into contact, nor (in the case of electrophoretic media containing particles with charges of both polarities) stick too firmly to particles of opposite charge. It may be difficult to find a single material which meets all the requirements for electrophoretic particles, and it is known to use as electrophoretic particles composite particles having a core of one material and a coating or shell of a different material. For example, the aforementioned U.S. Pat. Nos. 6,822,782, 7,002,728, and 7,230,750 describe electrophoretic particles having a core of a pigment, for example titania, carbon black or copper chromite, and a polymer coating. Other types of composite electrophoretic particles are described in U.S. Patent Application Publication No. 2002/ 0044333, and in Japanese Published Applications Nos. 2004- 318,006; 2004-233831; 2004-029699; 2004-004469; 2000- 227612; and 01-114829.

As already noted, it is desirable that electrophoretic particles provide high optical densities even when present only in very thin layers. To meet this requirement, electrophoretic particles are usually based on pigments; other types of materials, for example polymers colored with dyes, have been used but typically do not provide as high an optical density as is desirable. In electrophoretic media which require colored (as opposed to black and white) particles, it is often difficult to find pigments having a particular desired color. Inorganic pigments, while durable and well suited to use in electrophoretic media, offer a very limited color gamut. Organic pigments are available in a much wider range of colors, but frequently have a particle size much smaller than the wavelength of visible light, and so are of limited utility in light scattering media, such as electrophoretic media.

Accordingly, it is desirable to find a way to permit small particle organic pigments to be used in electrophoretic media and displays, and the present invention provides a composite electrophoretic particle which enables this to be done.

SUMMARY OF INVENTION

Accordingly, this invention provides a particle for use in an electrophoretic display, the particle comprising a light-scattering inorganic core and a light-transmissive colored shell of an organic pigment. The organic pigment is typically a small particle pigment, i.e., a pigment having an average particle size less than that of visible light, that is to say less than about 700 nm. The particle size of the organic pigment will often be much smaller than this, for example less than about 250 nm and in many cases less than about 100 nm. The light-scattering inorganic core may comprise titania.

The present invention extends to an electrophoretic medium comprising at least one particle of the present invention and a fluid, the particle being capable of moving through the fluid on application of an electric field thereto. The particles and the fluid may be encapsulated in a plurality of capsules or microcells, or present as a plurality of discrete droplets surrounded by a continuous phase comprising a polymeric material, thus forming a polymer-dispersed electrophoretic medium. The electrophoretic medium may comprise a single type of particle in a colored fluid, or two (or more) different types of electrically charged particles; where two different types of electrically charged particles are present, they may bear charges of the same or opposing polarity.

The present invention also extends to an electrophoretic display comprising an electrophoretic medium of the invention and at least one electrode arranged to apply an electric field to the electrophoretic medium.

The displays of the present invention may be used in any application in which prior art electrophoretic displays have been used. Thus, for example, the present displays may be used in electronic book readers, portable computers, tablet computers, cellular telephones, smart cards, signs, watches, shelf labels and flash drives.

The present invention also provides a process for producing a particle of the invention. This process comprises treating a light-scattering (typically white) inorganic pigment (which will form the core of the final particle) with a polymer which adsorbs on both the inorganic pigment and the organic pigment. The organic pigment is then added and allowed to mix with the polymer-coated inorganic pigment, thus forming a particle of the invention, which may be separated by centrifugation and dried. In a preferred form of this process, the composite particle thus produced is provided with a polymer coating in the manner described in the aforementioned U.S. Pat. No. 6,822,782. To produce such a polymer coating, the composite particle is reacted with a reagent having a functional group capable of reacting with, and bonding to, the composite particle, and also having a polymerizable or polymerization-initiating group. The functional group on the reagent reacts with the particle surface and attaches the polymerizable group thereto. The product of this step is then reacted with at least one monomer or oligomer under conditions effective to cause reaction between the polymerizable or polymerization-initiating group on the composite particle and the at least one monomer or oligomer, thereby causing the formation of polymer bonded to the composite particle. Desirably, the polymerizable group on the reagent is a vinyl group, which is polymerized with the monomer or oligomer by free radical polymerization.

A preferred inorganic pigment for use in the particles of the invention is titania. In the process of the invention, it will typically be desirable to wash excess polymer from the inorganic pigment before contacting the polymer-coated inorganic pigment with the organic pigment. Thorough mixing of the inorganic and organic pigments is generally necessary, and sonication is useful for this purpose. The reagent used in the next step of the process is preferably a silane coupling agent (see the aforementioned U.S. Pat. No. 6,822,782 for suitable agents of this type) which can react with both inorganic and organic pigments.

BRIEF DESCRIPTION OF DRAWING

The sole FIGURE of the accompanying drawings shows the response of the AN experimental display of the present invention to 500 and 1000 millisecond pulses of varying voltages and illustrates the electro-optic response of the display, as obtained in the Example below.

DETAILED DESCRIPTION

Figure 1:
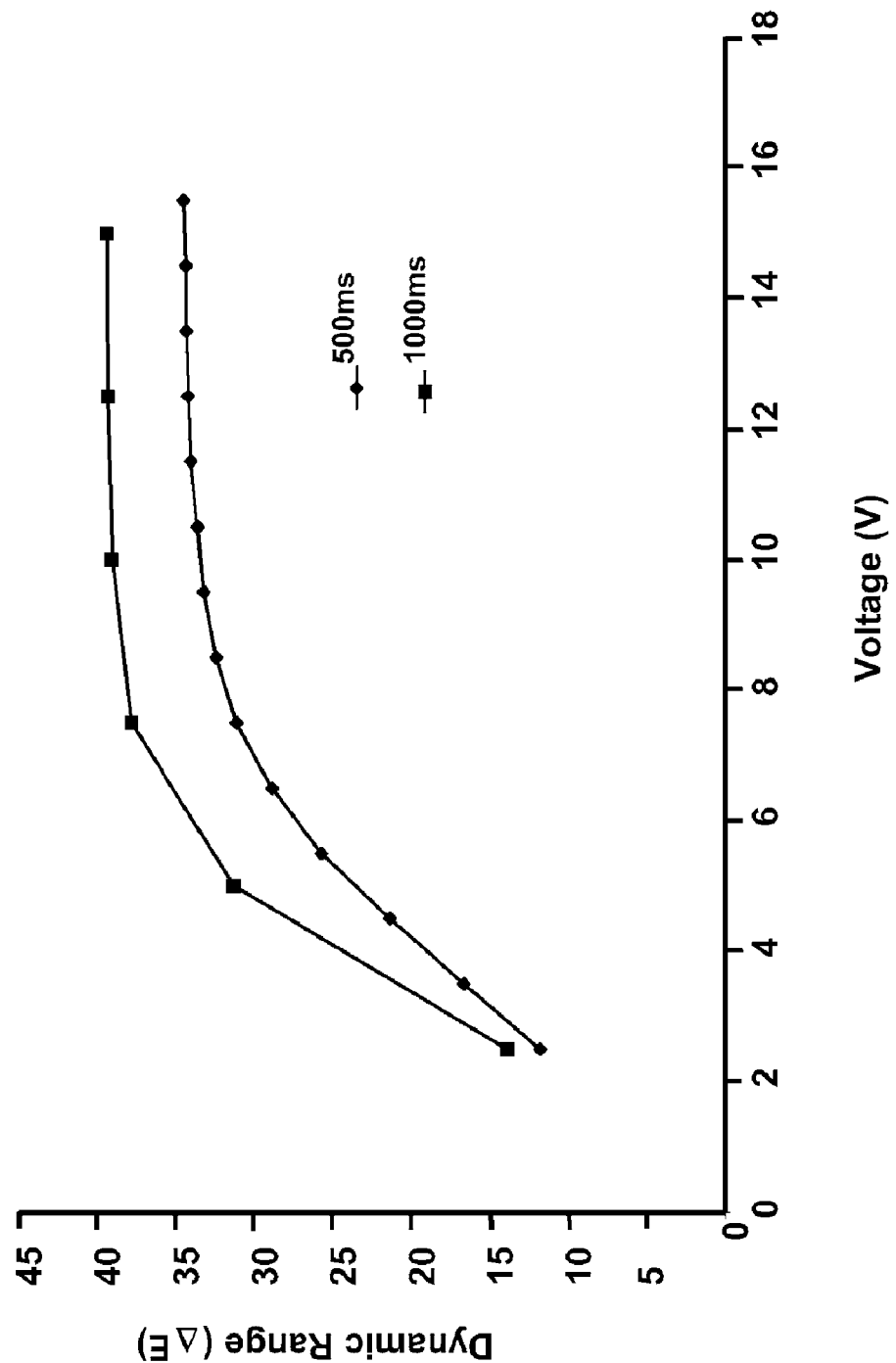

As indicated above, the present invention provides a particle for use in an electrophoretic display and comprising a light-scattering inorganic core, for example titania, and a light-transmissive colored shell of an organic pigment. The core should be highly scattering and the shell is desirably formed from a small particle organic pigment. Such a composite particle is highly scattering, because of the properties of the core pigment, but is also highly colored, because of the high weight ratio of organic pigment on the surface. The composite particles of the invention are much more highly colored than a similar core coated with, for example, a small molecule dye. Coating a reflective pigment with a colored organic pigment makes highly saturated, highly reflective pigments available in a wide array of colors. The particles of the present invention are highly scattering, brightly colored pigments that exhibit the advantages of both the inorganic and organic pigments from which they are formed, and allow the construction of electrophoretic media capable of displaying a much wider range of colors than previously accessible.

In one process for producing a particle of the invention, a polymer is chosen such that it will adsorb to both the inorganic and organic pigments, and will not interfere with later steps of the process. Particles of the inorganic core pigment are treated with an excess of the chosen polymer, which adsorbs to the pigment surface. The particles are thoroughly washed to remove the excess polymer. An organic pigment is then added to the particles, and the mixture is allowed to mix with sonication. The coated inorganic pigment is then isolated via centrifugation and allowed to dry, then treated with a silane coupling agent, which bonds the inorganic and organic pigments. Finally, the composite pigment is polymer coated by free radical vinyl polymerization.

Example

Four different composite particles of the present invention were prepared. In all four cases, the core inorganic pigment was titania (R-794 titania available from E.I. du Pont de Nemours & Company, Wilmington Del.). Four different organic pigments were used, namely Hostaperm Red Violet ER-02, Hostaperm Violet RL Special, Hostaperm Red P2GL-WD, and Hostaperm Blue B2G, all available commercially from Clariant Corporation, 500 Washington Street, Coventry R.I. 02816. According to the manufacturer, these organic pigments have average particle sizes in the range of about 50 to 100 nm. Only the preparation of the first composite particle will be described in detail, since the others were produced in an exactly similar manner.

Part A: Coating of Titania with Organic Pigment

A 10% by weight solution of poly(vinylpyrrolidone) (PVP) was produced by charging a 500 mL Erlenmeyer flask with deionized water (180 g) and poly(vinylpyrrolidone) (20 g, from Aldrich Chemical Company, molecular weight approximately 360,000). The flask was then placed on a hot plate with rapid magnetic stirring and low heat (solution temperature of about 45° C.), and mixed for three hours. The flask was removed from the heat, and allowed to cool with continued stirring. A separate 250 mL centrifuge bottle was charged with titania (du Pont R-794, 60 g) and deionized water (180 g). The bottle was shaken vigorously and sonicated for two hours to disperse the pigment. The resultant titania slurry was slowly added to the PVP solution (still under rapid stirring), and the mixture allowed to react overnight. The mixture was then divided between two 750 mL plastic bottles, and centrifuged at 3500 rpm for 10 minutes to isolate the polymer-coated pigment, the supernatant being decanted and discarded. (All centrifuging mentioned in this Example was carried out on a Beckman GS-6 centrifuge, available from Beckman Coulter, Inc., Fullerton, Calif. 92834.) Deionized water (approximately 300 g) was added to each centrifuge bottle, and the pigment was redispersed by shaking The bottles were then again centrifuged at 3500 rpm for 10 minutes, and the supernatant again decanted and discarded. Deionized water (90 g) was added to each bottle, and the pigment was redispersed by sonication to provide a polymer-coated titania dispersion ready for use in the next stage.

A 500 mL Erlenmeyer flask was charged with this polymer-coated pigment dispersion (approximately 60 g of pigment in 180 g of water). In a separate 250 mL plastic bottle, Clariant Hostaperm Red Violet ER-02 organic pigment (20 g) was dispersed in deionized water (180 g) by several hours of sonication. The resultant organic pigment slurry was slowly added to the titania slurry with rapid magnetic stirring. The resultant pigment mixture was stirred for one hour, and then discharged into a 1 L plastic bottle, which was filled with ethanol (approximately 500 mL), and sonicated for three hours. The pigment mixture was then divided between two 750 mL plastic bottles and centrifuged at 3500 rpm for 10 minutes, the supernatant being decanted and discarded. Ethanol (approximately 300 g) was added to each centrifuge bottle, and the pigment redispersed by shaking The bottles were again centrifuged at 3500 rpm for 10 minutes), and the supernatant again decanted and discarded. The composite pigment thus produced was air dried over night, and then oven dried for two days at 95° C. Finally, the composite pigment was hand ground using a mortar and pestle.

Part B: Surface Functionalization of Composite Pigment

The ground pigment prepared in Part A above (70 g) was dispersed in ethanol (180 g) by high-shear stirring (18.5 krpm for 7.5 minutes) followed by one hour of sonication. Deionized water (55 g) and ammonium hydroxide (2 mL) were added to the resultant slurry, which was then sonicated for a further one hour. Separately, a 1 L Erlenmeyer flask with rapid magnetic stirring was charged with ethanol (480 mL), deionized water (5 mL), and ammonium hydroxide (5.2 mL). 3-(N-styrylmethyl-2-aminoethylamino)propyltrimethoxysilane (55 mL of a 40 percent solution in methanol, from United Chemical Technologies, Inc., 2731 Bartram Road Bristol, Pa. 19007-6893) was added and the mixture stirred for five minutes. The pigment slurry was slowly added to the Erlenmeyer flask, and the resultant reaction mixture was stirred for 15 minutes. The reaction mixture was divided between two 750 mL plastic bottles and centrifuged at 3500 rpm for 10 minutes, the supernatant being decanted and discarded. Ethanol (approximately 500 g) was added to each centrifuge bottle, and the pigment was redispersed by shaking The bottles were again centrifuged at 3500 rpm for 10 minutes, and the supernatant again decanted and discarded. The silane-functionalized pigment thus produced was air dried over night, and then dried under vacuum at 65° C. for two hours. Finally, the pigment was hand ground using a mortar and pestle.

Part C: Polymer Coating of Composite Pigment

The dried pigment produced in Part B above was dispersed in a mixture of toluene (60 mL) and lauryl methacrylate (60 mL) by high-shear stirring (18.5 krpm for 7.5 minutes). The resultant slurry was transferred to a 250 mL round-bottomed flask provided with rapid magnetic stirring and heated on an oil bath to 65° C. The flask was purged with nitrogen. 4,4'-Azobisisobutyronitrile initiator (AIBN, 0.6 g) was separately dissolved in toluene (12 mL), and added to the reaction flask by pipette. The resultant mixture was allowed to react overnight, under nitrogen and at 65° C. The nitrogen was then removed, and ethyl acetate (approximately 100 mL) was added to the flask. The resultant mixture was divided between two 250 mL plastic bottles, and additional ethyl acetate (approximately 100 mL) was added to each bottle. The bottles were shaken vigorously and centrifuged at 3500 rpm for 15 minutes. An aliquot of the supernatant was then removed for free polymer testing, and the remainder was decanted and discarded. The pigment was washed twice by adding ethyl acetate (approximately 200 mL) to each bottle, shaking vigorously to disperse the pigment, and centrifuging at 3500 rpm for 15 minutes, with the supernatant being decanted and discarded. The resultant polymer-coated pigment was air dried overnight, then dried under vacuum at 65° C. overnight, and hand ground using a mortar and pestle. A 40% by weight dispersion of this polymer-coated pigment in Isopar E was prepared, sonicated for several hours, and mixed on a roll mill overnight.

Part D: Preparation of Internal Phase

An internal phase (180 g, ca. 150 mL) for an encapsulated electrophoretic medium was produced by combining the polymer-coated pigment slurry produced in Part C above (67.50 g) with 90.00 g of a 60 percent by weight stock solution of polymer-coated titania (titania coated with a 95:5 mole percent copolymer of lauryl methacrylate and 2,2,2-trifluoroethyl methacrylate, prepared substantially as described in the aforementioned U.S. Pat. No. 6,822,782) in Isopar G, a charging agent (Avecia Solsperse 17000, 10% by weight solution in Isopar E, 8.10 g), a surfactant (Span85, 0.41 g), and Isopar E (14.00 g) solvent. This dispersion was mixed on a roll mill overnight.

Part E: Encapsulation and Preparation of Electrophoretic Displays

A 500 mL jacketed reactor was heated to 40° C. and charged with deionized water (240 g) and dry gelatin (10 g). The resultant mixture was allowed to stand for one hour to allow the gelatin to swell. After this period, the gelatin solution was stirred slowly (100 rpm) with an overhead stirrer for thirty minutes. Separately, acacia (10 g) was dissolved in deionized water (98.3 g) and the resultant solution heated to 40° C. Also separately, the internal phase prepared in Part D above was heated to 40° C. and then added, over a period of approximately 2 minutes, to the gelatin solution. The gelatin solution was stirred (350 rpm) during the addition, which was conducted by introducing the internal phase through a dropping funnel, the outlet of which was placed below the surface of the gelatin solution. After the addition of the internal phase was complete, the rate of stirring was increased (to ca. 750 rpm) and the stirring continued for one hour at 40° C. in order to emulsify the internal phase into droplets having an average diameter of about 40 µm.

The emulsion thus produced was diluted with deionized water (153.3 g) warmed to 40° C., and the acacia solution was added. The pH of the resultant mixture was lowered to 4.80 using 10% aqueous acetic acid, and the stirring was continued for a further 40 minutes. The temperature of the mixture was then lowered to 10° C. over the course of two hours, and 2.5 g of 50% glutaraldehyde was added. After this addition, the mixture was gradually warmed to 25° C. and stirred vigorously for a further 12 hours. Finally, stirring was discontinued, and the mixture was discharged into a 750 mL plastic bottle.

The capsules thus produced were separated by size to yield a distribution between 30 and 50 µm diameter, with a mean diameter of about 40 µm; this can be effected by sieving the capsules for 120 seconds on a 38 μm sieve and then for 120 seconds on a 25 μm sieve to produce the final capsule slurry.

The capsule slurry thus produced was centrifuged, and the pH was raised above 8.0 by the addition of a 1% ammonium hydroxide solution. The capsule slurry was then mixed with a polyurethane binder at a ratio of 1 part by weight binder to 8 parts by weight of capsules; a 1% hydroxypropylmethylcellulose in water solution was added as a thickener, with a desired weight fraction of 0.002 HPMC in the slurry; and pure Triton X-100 was added as a surfactant, with a desired weight fraction of 0.001. The resultant slurry was stirred for one hour.

The slurry thus produced was bar coated on to a 5 mil (127 μm) thick polyester film coated on one surface with indium tin oxide, the slurry being coated on to the indium tin oxide covered surface. The coated films were oven dried at 60° C. for 15 minutes to produce an electrophoretic medium approximately 30 μm thick containing essentially a single layer of capsules (see the aforementioned U.S. Pat. No. 6,839, 158).

From this film, a front-plane laminate (see the aforementioned U.S. Pat. No. 6,982,178 for a description of the structure of this laminate) was produced by laminating a doped polyurethane adhesive over the capsule layer. The front plane laminate was then laminated to a segmented graphite backplane comprising a layer of graphite on a polyester film to produce experimental electro-optic displays of the present invention suitable for measurement of their electro-optical properties.

Part F: Pigment Characterization

The final composite pigment (denoted "FCP" in the Table below) of the present invention produced in Part C above, and various intermediate products were subjected to thermogravimetric analysis. The intermediate products tested were:

(a) the raw titania prior to PVP coating (denoted simply "titania" in the Table below);
(b) the titania with PVP coating produced at an intermediate stage of Part A above (denoted "titania/PVP" in the Table below);
(c) the titania/PVP/organic composite pigment which is the final product of Part A above (denoted "titania/OP" in the Table below); and
(d) the silanized composite pigment which is the final product of Part B above (denoted "SP" in the Table below).

The Table below shows the weight loss of each material below 400° C. and below 700° C. The columns headed "Δ" show the difference between the weight loss for the relevant product and that for the immediately preceding product, i.e., for the material in the preceding line of the Table.

TABLE

| Material | Weight loss <400° C., % | Δ, % | Weight loss <700° C., % | Δ, % |
|---|---|---|---|---|
| titania | 0 | — | 0 | — |
| titania/PVP | 1.5 | 1.5 | 2.1 | 2.1 |
| titania/OP | 1.3 | −0.2 | 30.4 | 28.3 |
| SP | 2.9 | 1.4 | 31.8 | 1.4 |
| FCP | 11.3 | 8.4 | 41.9 | 10.1 |

The data in the Table are completely consistent with the structure of the composite pigments of the present invention discussed above. In the first stage of the process for preparing the composite pigment, the core inorganic pigment is treated with poly(vinylpyrrolidone) (PVP), and between 1.5 and 2.1% by weight of the polymer is adsorbed on the pigment surface. If the radius of the titania particles is assumed to be that claimed by the manufacturer (200 nm), this amount of PVP corresponds to 2.0 to 2.8 mg/m² of surface. The addition of the organic pigment ER-02 leads to a material that has a very large amount of organic material attached to it, with a total weight loss of 30.4%, almost all at a temperature>400° C. The organic pigment is stated by the manufacturer to have a diameter of 70 nm, with a density of 1.49 g/mL. If one assumes a monolayer coverage of the core pigment by a square, close-packed array of spherical particles of this size, the effective density will be reduced to 0.52*1.49=0.78 g/mL. Thus, if 30.4% of the sample is organic, then 69.6% is titania, with a surface area of 5.22 m²/g. A 70 nm thick layer of pigment on this area would have a volume of 0.36 mL, or about 0.285 g, corresponding to 29% by weight. The observed amount of pigment is (30.4-2.1)=28.3%, in almost exact agreement with this theoretical calculation.

Further reaction with the silane leads to a surface-functionalized pigment with a further increase of organic material of about 1.4%, typical of surface-functionalization reactions of this type. The subsequent polymerization reaction finally results in a polymer grafted composite pigment particle, with a further weight gain of around 10%, observed both in the total weight loss and in the low temperature (<400° C.) region, where grafted polymer shells have previously been observed to volatilize in measurements of this type. The amount of grafted polymer is also similar to that observed in other grafting reactions on simple pigments.

Part G: Electro-Optic Properties

The experimental encapsulated electrophoretic display prepared in Part E above was found to have excellent electro-optic characteristics. In its white state, the electro-optic values were 76.4 L*, 2.7 a* and −2.5 b*, which is a bright, nearly neutral white. In its dark state, the electro-optic values were 52.7 L*, 25.7 a* and −8.6 b*, corresponding to a bright, slightly bluish red. The pure pigment color, as indicated by the color patch supplied by the manufacturer, has 49.1 L*, 60.6 a*, and −9.5 b*. Thus, the color obtained in the device with the composite pigment of the invention is somewhat lighter and desaturated relative to the pure organic pigment, but has a similar hue.

The sole FIGURE of the accompanying drawings shows the response of the experimental display to 500 and 1000 millisecond pulses of varying voltages. This FIGURE illustrates the excellent electro-optic response to the display, with electro-optic saturation (i.e., an extreme optical state) being achieved at voltages of about 8-10 V at these pulse lengths.

From the foregoing, it will be seen that the present invention can provide brightly colored particles for electrophoretic displays using light scattering pigments. This invention may be especially useful for full color patterned displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A process for producing a particle comprising a light-scattering inorganic core and a light-transmissive colored shell of an organic pigment, the process comprising:
   treating a light-scattering inorganic pigment with a polymer which adsorbs on both the inorganic pigment and an organic pigment; and
   adding the organic pigment and allowing the organic pigment to mix with the polymer-coated inorganic pigment, thus forming the particle, wherein the inorganic pigment comprises titania.

2. A process according to claim 1 wherein the particle formed is thereafter
(a) reacted with a reagent having a functional group capable of reacting with, and bonding to, the particle, and also having a polymerizable or polymerization-initiating group, whereby the functional group on the reagent reacts with the particle surface and attaches the polymerizable group thereto; and
(b) the product of step (a) is reacted with at least one monomer or oligomer under conditions effective to cause reaction between the polymerizable or polymerization-initiating group on the particle and the at least one monomer or oligomer, thereby causing the formation of polymer bonded to the particle.

3. A process according to claim 2 wherein the polymerizable group on the reagent is a vinyl group, and this vinyl group is polymerized with the monomer or oligomer by free radical polymerization.

4. A process according to claim 2 wherein the reagent used in step (a) is a silane coupling agent.

5. A process according to claim 1 wherein, after the light-scattering inorganic pigment has been treated with the polymer, excess polymer is washed from the inorganic pigment before the polymer-coated inorganic pigment is contacted with the organic pigment.

* * * * *